US010687112B2

(12) United States Patent
Yamagishi

(10) Patent No.: US 10,687,112 B2
(45) Date of Patent: Jun. 16, 2020

(54) CLIENT TERMINAL AND OPERATION METHOD OF CLIENT TERMINAL, TRANSMISSION SERVER AND OPERATION METHOD OF TRANSMISSION SERVER, AND PROGRAM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/362,724

(22) PCT Filed: Dec. 4, 2012

(86) PCT No.: PCT/JP2012/081304
§ 371 (c)(1),
(2) Date: Jun. 4, 2014

(87) PCT Pub. No.: WO2013/088982
PCT Pub. Date: Jun. 20, 2013

(65) Prior Publication Data
US 2014/0359684 A1 Dec. 4, 2014

(30) Foreign Application Priority Data
Dec. 12, 2011 (JP) ................................. 2011-271114

(51) Int. Cl.
*H04N 21/422* (2011.01)
*H04N 21/2362* (2011.01)
(Continued)

(52) U.S. Cl.
CPC ..... *H04N 21/4622* (2013.01); *H04N 21/2665* (2013.01); *H04N 21/26616* (2013.01);
(Continued)

(58) Field of Classification Search
None
See application file for complete search history.

(56) References Cited

U.S. PATENT DOCUMENTS 6,990,677 B1* 1/2006 Pietraszak .......... H04N 5/44543
348/E5.105
2001/0030785 A1 10/2001 Pangrac et al.
(Continued)

FOREIGN PATENT DOCUMENTS

CN 1859139 A 11/2006
CN 101681340 A 3/2010
(Continued)

OTHER PUBLICATIONS

International Search Report from International Publication PCT/JP2012/081304 dated Jan. 8, 2013.
(Continued)

*Primary Examiner* — Nasser M Goodarzi
*Assistant Examiner* — Terrika Peterson
(74) *Attorney, Agent, or Firm* — Lerner, David, Littenberg, Krumholz & Mentlik, LLP

(57) ABSTRACT

The present invention relates to a client terminal and an operation method of a client terminal, a transmission server and an operation method of a transmission server, and a program, whereby manufacturing costs, developing costs, and maintenance costs can be reduced for a television receiver which is a client terminal, regarding a configuration for distribution of contents from multiple service providers. An application (program) 111 capable of operating on a browser 91 presents VoD contents which it can select itself, based on control information, and requests a VoD server 72 for distribution of VoD contents selected out of the presented VoD contents via a first network which is a bi-directional IP network. In response, a headend 12 which is a transmission server supplies to a client terminal 13 via a second network
(Continued)

of which downstream transmission band has sufficient band for transmission of contents. The present technology can be applied to an IPTV distribution system.

19 Claims, 6 Drawing Sheets

(51) Int. Cl.
| | |
|---|---|
| *H04N 21/462* | (2011.01) |
| *H04N 21/643* | (2011.01) |
| *H04N 21/266* | (2011.01) |
| *H04N 21/2665* | (2011.01) |
| *H04N 21/472* | (2011.01) |
| *H04N 21/61* | (2011.01) |
| *H04N 21/6587* | (2011.01) |
| *H04N 21/81* | (2011.01) |
| *H04N 5/44* | (2011.01) |

(52) U.S. Cl.
CPC ... *H04N 21/47202* (2013.01); *H04N 21/6118* (2013.01); *H04N 21/6125* (2013.01); *H04N 21/64322* (2013.01); *H04N 21/6587* (2013.01); *H04N 21/8173* (2013.01)

(56) References Cited

U.S. PATENT DOCUMENTS

| | | | |
|---|---|---|---|
| 2002/0067376 A1* | 6/2002 | Martin | G06Q 30/02 715/810 |
| 2003/0014762 A1* | 1/2003 | Conover et al. | 725/110 |
| 2003/0126610 A1 | 7/2003 | Ando | |
| 2004/0019900 A1* | 1/2004 | Knightbridge | G06Q 30/0207 725/23 |
| 2004/0078807 A1* | 4/2004 | Fries | H04N 7/165 725/14 |
| 2005/0120377 A1* | 6/2005 | Carlucci | G06F 3/0482 725/90 |
| 2005/0144645 A1* | 6/2005 | Casey et al. | 725/95 |
| 2006/0195660 A1 | 8/2006 | Sundarrajan et al. | |
| 2008/0048255 A1 | 2/2008 | Ishida et al. | |
| 2008/0098450 A1* | 4/2008 | Wu | H04N 21/4312 725/132 |
| 2008/0208953 A1 | 8/2008 | Tian | |
| 2008/0244658 A1* | 10/2008 | Chen | 725/50 |
| 2009/0083415 A1 | 3/2009 | Tola et al. | |
| 2009/0100147 A1 | 4/2009 | Igarashi | |
| 2009/0100489 A1 | 4/2009 | Strothmann | |
| 2009/0158336 A1* | 6/2009 | Newdeck | G11B 27/322 725/44 |
| 2010/0030785 A1 | 2/2010 | Wilson et al. | |
| 2010/0153997 A1* | 6/2010 | Baumgartner | H04N 5/44543 725/39 |
| 2010/0205643 A1 | 8/2010 | Raftelis et al. | |
| 2011/0035780 A1 | 2/2011 | Cedervall et al. | |
| 2011/0053623 A1 | 3/2011 | Rovira et al. | |
| 2011/0225610 A1* | 9/2011 | Prieto | H04N 7/173 725/38 |
| 2011/0239263 A1 | 9/2011 | Kim et al. | |
| 2012/0023265 A1* | 1/2012 | Liao | G06F 13/387 710/5 |
| 2012/0023524 A1* | 1/2012 | Suk | H04N 21/42222 725/43 |
| 2012/0291071 A1* | 11/2012 | Seo | H04N 21/26283 725/41 |
| 2012/0331513 A1* | 12/2012 | Yamagishi et al. | 725/95 |
| 2014/0006951 A1* | 1/2014 | Hunter | H04H 60/31 715/719 |
| 2017/0359613 A1* | 12/2017 | Hedhli | H04N 21/47202 |

FOREIGN PATENT DOCUMENTS

| | | |
|---|---|---|
| CN | 102104632 A | 6/2011 |
| JP | H10290445 A | 10/1998 |
| JP | 2003179903 A | 6/2003 |
| JP | 2011-120246 A | 6/2011 |
| JP | 2011-193058 A | 9/2011 |
| JP | 4780248 B2 | 9/2011 |
| KR | 100722705 B1 | 6/2007 |
| RU | 2008136041 A | 3/2010 |
| WO | 03065566 A1 | 8/2003 |
| WO | 2008048255 A1 | 4/2008 |
| WO | 2013065566 A1 | 5/2013 |

OTHER PUBLICATIONS

Extended European Search Report for EP Application No. 12856647.8, dated May 4, 2015.
Commercial Requirements for Hybrid Broadcast-Broadband Services, CM848 CRs Hybrid Broadcast-Broadband Services.doc, pp. 1-19.
Digital Video Broadcasting (DVB) Network-independent protocols for DVB interactive Services, European Telecommunications Standards Institute, pp. 1-22, 1997.
Japanese Office Action for Application No. 2013-549213 dated Sep. 6, 2016.
Japanese Notification to Grant Application No. 2013-549213 dated Jul. 11, 2017, 2 pages.
ETSI TS 102 796 v1.1.1 (Jun. 2010) Technical Specification, Hybrid Broadcast Broadband TV, pp. 1-75.

\* cited by examiner

CLIENT TERMINAL AND OPERATION METHOD OF CLIENT TERMINAL, TRANSMISSION SERVER AND OPERATION METHOD OF TRANSMISSION SERVER, AND PROGRAM

CROSS-REFERENCE TO RELATED APPLICATION

The present application is a national phase entry under 35 U.S.C. § 371 of International Application No. PCT/JP2012/081304 filed Dec. 4, 2012, published on Jun. 20, 2013 as WO 2013/088982 A1, which claims priority from Japanese Patent Application No. JP 2011-271114, filed in the Japanese Patent Office on Dec. 12, 2011.

TECHNICAL FIELD

The present technology relates to a client terminal and an operation method of a client terminal, a transmission server and an operation method of a transmission server, and a program, and more specifically, it relates to a client terminal and an operation method of a client terminal, a transmission server and an operation method of a transmission server, and a program, whereby manufacturing costs, developing costs, and maintenance costs can be reduced for a television receiver which is a client terminal handling distribution of contents from multiple service providers.

BACKGROUND ART

The conventional IPTV (Internet Protocol Television) broadcast system has been a method where control messages and AV streams of contents are both transferred over the same bidirectional IP (Internet Protocol) network.

However, with regard to television receivers which are connected to cable broadcast networks having plentiful available bandwidth already (or to be newly set up), but have insufficient bidirectional IP network bandwidth, network resources may be able to be used more efficiently by VoD (Video on Demand) streams requested from individual client terminals being individually delivered using channels on the cable broadcast network. This form of distribution system is being proposed as a cable VoD service system (see PTL 1).

CITATION LIST

Patent Literature

PTL 1: Japanese Unexamined Patent Application Publication No. 2011-193058

SUMMARY OF INVENTION

Technical Problem

Now generally, a cable VoD service which a service provider or cable operator provides (service provider provided IPTV service) requires the service provider to provide all cable VoD-STBs (Set Top Box) and perform maintenance thereof, so service maintenance costs are incurred.

To solve this problem, service providers have been requesting multiple different television receiver manufactures to implement a cable VoD service protocol in television receivers proper, so that the service providers do not have to provide STBs.

However, with the cable VoD service system currently on the market, cable VoD service protocols to which service providers have individually stipulated need to be implemented in televisions which are client terminals. The manufacturers of television receivers desire to apply a configuration built into a television receiver which is a client terminal, developed for a certain cable VoD service, to provide multiple cable VoD services.

However, in order to realize this, a single type of television receiver must implement multiple devices corresponding to the individual cable VoD service protocols of the service providers, leading to costs for the manufacturers of the television receivers for implementation of the devices corresponding to the protocols, and also maintenance regarding to additional functions in accordance with requests from the service providers, and so forth.

Implementation of cable VoD service in the current market often is of a configuration where control information unique to a cable VoD service is broadcast over the cable broadcast band using the individual protocol, and access is made to a VoD server at a local cable headend, based on that information. The processing system of control information unique to that service provider must be implemented in the television receiver proper, so the manufacturer of the television receiver incurs the costs of implantation of devices corresponding to the protocol, and maintenance such as addition of functions and the like.

On the other hand, regardless of television receivers from multiple different manufacturers, the service providers have to provide end users with a uniform service which does not depend on difference in implementation in television receivers of multiple different manufacturers, which takes time for testing, service development such as service quality management, and maintenance.

The present technology has been made in light of this situation, and accordingly it is a particular object thereof to realize multiple different cable VoD service client application programs as an application program which can run on a browser, thereby reducing costs relating to manufacturing, development, and maintenance of implementation for service providers providing multiple different contents which can be played on a television receiver, and to make service quality among service providers to be more uniform.

Solution to Problem

A client terminal according to a first aspect of the present technology includes a reception unit configured to receive control information including broadcast contents, self-requested contents, and access information to a transmission server, from the transmission server via a first network of which the downstream transmission band has a band sufficient to transmission of contents; and a browser application program which is a program operable on a browser, configured to present the self-selectable contents based on control information transmitted from the transmission server, and request the transmission server for distribution of contents selected out of the presented contents, via a second network which is a bidirectional IP network.

The reception unit may receive the requested contents from the transmission server, via a channel on the first network allocated as the channel over which the requested contents are to be transmitted.

An operation method of a client terminal according to the first aspect of the present technology includes the steps of: reception processing for receiving control information including broadcast contents, self-requested contents, and access information to a transmission server, from the transmission server via a first network of which the downstream transmission band has a band sufficient to transmission of contents; and a browser application program, which is a program operable on a browser, performing processing of presenting the self-selectable contents based on control information transmitted from the transmission server, and requesting the transmission server for distribution of contents selected out of the presented contents, via a second network which is a bidirectional IP network.

A program according to the first aspect of the present technology causes a computer to function as: a reception unit configured to receive control information including broadcast contents, self-requested contents, and access information to a transmission server, from the transmission server via a first network of which the downstream transmission band has a band sufficient to transmission of contents; and a browser application program which is a program operable on a browser, configured to present the self-selectable contents based on control information transmitted from the transmission server, and request the transmission server for distribution of contents selected out of the presented contents, via a second network which is a bidirectional IP network.

A transmission server according to a second aspect of the present technology includes a transmission unit configured to transmit, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and a client-terminal-requested-content supplying unit configured to supply the contents requested to the transmission unit, based on a play control signal for contents requested by the browser application program at the client terminal via a second network which is a bidirectional IP network.

A channel allocation unit configured to allocate a channel over which to transmit contents requested from the client terminal via the first network may be included; and the transmission unit may transmit contents supplied from the client-terminal-requested-content supplying unit to the client terminal via the channel on the first network allocated by the channel allocation unit.

In a case where distribution of contents has been requested from the client terminal, the channel allocation unit may dynamically allocate a channel to transmit the contents requested by the client terminal, to a channel other than the broadcast contents on the first network.

An operation method of a transmission server according to the second aspect of the present technology includes the steps of: transmission processing for transmitting, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and client-terminal-requested-content supplying processing for supplying the contents requested in the transmission processing, based on a play control signal for contents requested by the browser application program at the client terminal via a second network which is a bidirectional IP network.

A program according to the second aspect of the present technology causes a computer to function as: a transmission unit configured to transmit, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and a client-terminal-requested-content supplying unit configured to supply the contents requested to the transmission unit, based on a play control signal for contents requested by the browser application program at the client terminal via a second network which is a bidirectional IP network.

According to the first aspect of the present technology, control information is received including broadcast contents, self-requested contents, and access information to a transmission server, from the transmission server via a first network of which the downstream transmission band has a band sufficient to transmission of contents, and a browser application program, which is a program operable on a browser, presents the self-selectable contents based on control information transmitted from the transmission server, and requests the transmission server for distribution of contents selected out of the presented contents, via a second network which is a bidirectional IP network.

According to the second aspect of the present technology, control information is transmitted, to a client terminal, via a first network of which the downstream transmission band has a band sufficient to transmission of contents, for causing a browser application program running on a browser at the client terminal to operate, the control information including broadcast contents, contents requested by the client terminal, and access information to self, and the contents requested are supplied to the transmission unit, based on a play control signal for contents requested by the browser application program at the client terminal via a second network which is a bidirectional IP network.

The client terminal and transmission server according to the present technology may be independent devices, or may be blocks which perform operations as a client terminal and transmission server.

Advantageous Effects of Invention

In either of the first aspect and second aspect of the present technology, the service quality amount service providers can be made uniform while reducing costs relating to manufacturing, developing, and maintenance of devices for service providers which provide multiple different contents which can be played at television receivers.

DESCRIPTION OF EMBODIMENTS

An embodiment of the present disclosure (hereinafter referred to as present embodiment) will now be described. Note that description will be made in the following order.
1. Present Embodiment (example of case where VoD channel is allocated beforehand)
2. Modification (example of case where VoD channel is allocated dynamically)

Present Embodiment

Configuration Example of IPTV Distribution System

Figure 1:
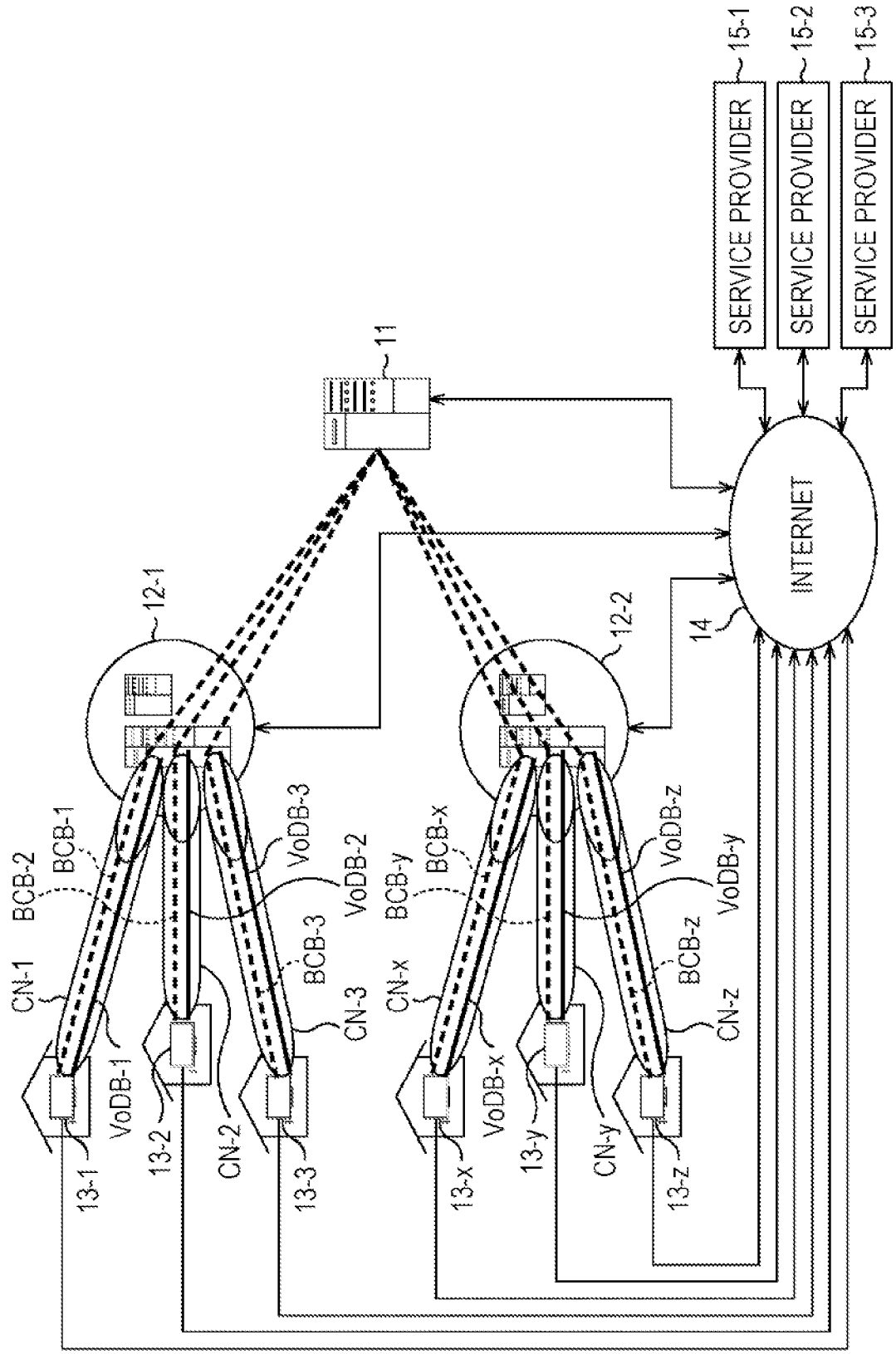
FIG. 1 is a block diagram illustrating a configuration example of an embodiment of an IPTV distribution system including a client terminal, and headend and backend, to which the present technology has been applied.

FIG. 1 illustrates a configuration example of an embodiment of an IPTV (Internet Protocol Television) distribution system configured including a client terminal and transmission server, to which the present technology has been applied.

The IPTV distribution system illustrated in FIG. 1 is configured including a backend 11, headends 12-1 and 12-2, client terminals 13-1 through 13-3 and 13-x, 13-y, and 13-z, and the Internet 14. The IPTV distribution system is to distribute broadcast contents and VoD (Video on Demand) contents from the backend 11 to the client terminals 13-1 through 13-3 and 13-x, 13-y, and 13-z via the headends 12-1 and 12-2 provided in each region, using a bidirectional IP network and cable broadcast network. Of these, the backend 11 and the headends 12 together practically function as transmission servers, as if it were, transmitting (distributing) contents through the IPTV distribution system. Note that if there is no particular need to distinguish between the headends 12-1 and 12-2, and the client terminals 13-1 through 13-3 and 13-x, 13-y, and 13-z, these will be simply called headend 12 and client terminal 13, as will other configurations as well.

There is basically just one backend 11 nationwide, which distributes broadcast contents from the headends 12 to all client terminals 13 over a main channel, via the cable broadcast network. The backend 11 also distributes control information which a browser application program stored in the client terminals 13 can read at the time of startup, VoD channel information which is information of channels where VoD contents are distributed, and VoD server access information which is information to access a VoD server, by time-division multiplexing on the main channel. The backend 11 distributes a portal page via the Internet 14 which is an IP network, where access from the client terminals 13 is accepted and processing to sell VoD contents is performed, based on the control information supplied to the client terminals 13.

The headends 12 are provided to each region, with distribution to the client terminals 13 of each region being allocated to each channel. The headends 12 distribute broadcast contents supplied from the backend 11, and also distribute VoD contents managed by themselves.

That is to say, in the case illustrated in FIG. 1, the headend 12-1 distribute broadcast contents and VoD contents to the client terminals 13-1 through 13-3 for each preset channel, via cable network lines CN-1 through CN-3. A cable network line CN is a cable standard C2 (Cable 2) cable stipulated in DVB (Digital Video Broadcasting) for example, or the like. The headend 12-2 also distribute broadcast contents and VoD contents to the client terminals 13-x, 13-y, and 13-z, for each preset channel, via cable network lines CN-x, CN-y, and CN-z.

In further detail, the headend 12-1 distributes broadcast contents to the client terminals 13-1 through 13-3 via each of the channels BCB-1 through BCB-3 for broadcast contents, illustrated by the dotted lines in FIG. 1. Also, the headend 12-2 distributes broadcast contents to the client terminals 13-1 through 13-3, and 13-x, 13-y, and 13-z, via each of the channels BCB-x, BCB-y, and BCB-z for broadcast contents, illustrated by the dotted lines in FIG. 1. The channels BCB-1 through BCB-3 and BCB-x, BCB-y, and BCB-z are common channels, so the client terminals 13-1 through 13-3 and 13-x, 13-y, and 13-z receive distribution of broadcast channels over the same channels.

On the other hand, the headend 12-1 distributes VoD contents to the client terminals 13-1 through 13-3 via VoD content channels VoDB-1 through VoDB-3, respectively. The headend 12-2 distributes VoD contents to the client terminals 13-x, 13-y, and 13-z via VoD content channels VoDB-x, VoDB-y, and VoDB-z, respectively, illustrated in FIG. 1 by solid lines. The channels VoDB-1 through VoDB-3 and VoDB-x, VoDB-y, and VoDB-z are individual channels to the respective client terminals 13, so the client terminals 13-1 through 13-3 and 13-x, 13-y, and 13-z receive distribution of VoD channels each through dedicated channels. The headends 12 manage allocation of VoD channels VoDB when distributing VoD contents to the client terminals 13 by such a configuration. Here, we will say that VoD channels VoDB have been pre-allocated, and that basically there is no change thereof.

Note that while FIG. 1 illustrates a case where the number of headends 12 managed by the backend 11 is two, and the number of client terminals 13 managed by each headend 12 is three each, but numbers other than these may be managed.

The client terminal 13 is a so-called television receiver, which receives distribution of broadcast contents or VoD contents supplied from the headend 12 and displays audio and images. At the client terminal 13, an application program which operates on a so-called browser (application 111 (FIG. 2)) is downloaded from a portal server 51 for each service provider which is the distributing source of the VoD contents, operates based on control information included in the broadcast contents, and also performs purchasing processing of VoD contents. Also, (the application 111 of) the client terminal 13 accesses a VoD server 72 (FIG. 2) of the headend 12 via the Internet 14, based on access information to the VoD server 72 of the headend 12 included in the broadcast contents. Further, (the application 111 of) the client terminal 13 supplies control commands such as playing and stopping of the VoD contents to the VoD server 72, so as to control playing of the VoD contents being distributed thereto.

[Configuration Example of Backend, Headend, and Client Terminal]

Next, a configuration example of the backend 11, headend 12, and client terminal 13 making up the IPTV distribution system in FIG. 1 will be described with reference to the block diagram in FIG. 2.

First, a configuration example of the backend 11 will be described.

The backend 11 has a portal server 51 and a broadcast content distributing unit 52. The portal server 51 accepts download requests from the client terminal 13 via the Internet 14, and causes the portal page to be downloaded. The broadcast content distributing unit 52 distributes broadcast contents common to all regions and all client terminals 13, such as VoD content promotion programs for example, to the client terminal 13 via the headend 12.

Next, a configuration example of the headend 12 will be described.

The headend 12 includes a MUX 71, a VoD server 72, a resource management server 73, and a modulator 74. The MUX 71 multiplexes VoD contents supplied from the VoD server 72, AV streams made up of broadcast contents supplied from the backend 11, and control information, VoD channel information, and VoD server access information packets supplied from the resource management server 73, so as to generate a transport stream. The modulator 74 modulates the stream data (transport stream) by C2-QAM (Quadrature Amplitude Modulation) or the like, and distributes to the client terminal 13 over the cable network line CN. Now, in the case of modulating a transport stream of normal broadcast contents, a VoD content transport stream, or a stream of control information, VoD channel information, and VoD server access information alone, may be multiplexed and modulated. Further, the modulator 74 distributes broadcast channels and VoD channels based on channel information allocated by the resource management server 73.

The resource management server 73 manages, of the broadcast channel bands for the cable network lines CN under the control of that server, channels to be allocated to VoD channels for distributing VoD contents. More specifically, the resource management server 73 assigns (reserves) or releases channels to be allocated to VoD channels. Assigning VoD channels may be performed by fixedly allocating multiple channels before operating so as not to be changed while operating, or by assigning beforehand only common VoD channels to carry information necessary to identify which region the cable network belongs to (channels over which actual VoD content transport streams are not streamed) to be used in common among all clients before operating, and dynamically assigning VoD channels on the fly only in cases where an actual VoD distribution request is made by a client. The resource management server 73 also supplies nationwide control information, VoD channel information which differs for each headend 12, i.e., each region, and VoD server access information, to the MUX 71. Note that description will be made here regarding an example where VoD channels have been fixedly allocated beforehand at a stage before operating, and the stage before operating.

The VoD server 72 accepts requests for distribution of VoD contents from clients handled by a headend 12 (from client terminals 13 capable of receiving VoD contents distributed using the VoD channel bands of the cable network in each region), and transmits stream data (transport stream) of the accepted VoD contents.

Next, a configuration example of the client terminal 13 will be described.

The client terminals 13 includes a browser 91, a photoreceiver 92, a communication unit 93, a tuner 94, a renderer 95, and a display unit 96. The browser 91 analyzes information of files described in various types of languages such as HTML (Hyper Text Markup Language) and Java script, and displays on the display unit 96 formed of such as an LCD (Liquid Crystal Display) or organic EL (Electronic Luminescent) via the renderer 95. Note that the browser 91 usually refers to a program which runs on an OS (operating system) installed in a computer, to display various types of files, but here illustrates that the environment which the browser can operate is realized as hardware or software. Accordingly, the browser 91 here is a hardware or software configuration which functions as a browser by an unshown microcomputer or the like provided to the client terminal 13.

Application programs 111-1 through 111-3 (hereinafter may also be referred to as applications 111-1 through 111-3) are programs which can run on the browser 91, and are downloaded from the portal server 51 by the browser 91 for each of the service providers which are distributing sources of the VoD contents. The application 111 executes this portal page to present selectable (viewable) VoD contents on the display unit 96, and desired VoD contents can be selected by an operating signal being operated from a remote controller 41.

Further, upon the remote controller 41 being operated to select the desired VoD content, and a signal indicating this being received at the photoreceiver 92, the application 111 switches the tuner 94 to the VoD channel where the VoD content is distributed, by way of a standard API on the browser 91, based on the channel information. At the same time, the application 111 controls the communication unit 93 by way of a standard API to access the VoD server 72 of the headend 12 via the Internet 14, and supply a play control command which controls playing of the VoD content, based on VoD server access information. This play control command causes the VoD server 72 of the headend 12 to supply stream data (transport steam) to the MUX 71. As a result, the MIX 71 supplies stream data to the modulator 74. The modulator 74 modulates this stream data and distributes to the client terminal 13 over the VoD channel allocated beforehand. Accordingly, the tuner 94 of the client terminal 13 acquires the transport stream of the VoD content by switching to the VoD channel necessary to receive the VoD content begin distributed by the headend 12, and supplies this to the renderer 95. The renderer 95 displays moving images, for example, of the transport stream on the display unit 96.

[Communication Processing]

Next, communication processing by the IPTV distribution system illustrated in FIG. 2 will be described with reference to the flowchart in FIG. 3.

In step S1, the resource management server 73 generates control information, VoD channel information, and VoD server access information, and supplies this to the MUX 71. Also in the same way, stream data of broadcast contents supplied from the broadcast content distributing unit 52 of the backend 11 is supplied to the MUX 71.

In step S11, the MUX 71 acquires the broadcast contents stream data supplied from the backend 11 and the control information, VoD channel information, and VoD server access information supplied from the resource management server 73, multiplexes this, and supplies to the modulator 74. Accordingly, the modulator 74 modulates the multiplexed broadcast contents stream data, control information, VoD channel information, and VoD server access information, according to a main channel band, and distributes to the client terminals 13 via the cable network line CN.

In step S41, the tuner 94 of the client terminal 13 is set to the main channel by a standard API of the browser 91. Accordingly, the tuner 94 receives the broadcast content stream data where the control information, VoD channel information, and VoD server access information have been multiplexed, that is distributed from the headend 12 by the processing in step S11. The tuner 94 then supplies the received broadcast content stream data where the control information, VoD channel information, and VoD server access information have been multiplexed, to the browser 91 and renderer 95.

In step S81, the renderer 95 displays the nationwide broadcast content supplied by the processing in step S41 on the display unit 96. The broadcast contents is, for example, a VoD content promotion program by the service provider, for example.

On the other hand, in step S61, the browser 91 acquires the control information, VoD channel information, and VoD server access information.

In step S62, the browser 91 controls the control unit 93 based on the control information, and accesses the portal server 51 of the backend 11 via the Internet 14. The application 111 then requests the portal server 51 for a download of the portal page.

In response to this request, in step S31 the portal server 51 of the backend 11 allows the client terminal 13 to download information of the portal page regarding which there has been the request from the browser 91, over the Internet 14.

In step S63, the application 111 acquires the data of the portal page from the portal page 51 over the Internet 14, and supplies what is included such as the titles of the VoD contents included in the portal page, for example, to the renderer 96.

In response to this processing, in step S82 the renderer 95 displays what is included in the portal page such as the titles of the VoD contents, which the application 111 renders, on the display unit 96.

In further detail, the control information is configured including a Portal Application AIT (Application Information Table) set for each service provider, for example. Thus, upon this information being supplied from the tuner 94, the browser 91 itself accesses the portal server 51 by controlling the communication unit 93 based on the URL (Universal Resource Locator) of the portal server 51 included in the control information, downloads and application 111 corresponding to the relevant service provider from applications 111-1 through 111-3 configured as the portal page which can run on the browser 91, and starts operation. The portal page which is the downloaded application 111 controls the renderer 95 so as to display a list of viewable VoD contents and a selection screen thereof on the display unit 96. This series of operations allows the user to view a promotion program of viewable VoD contents, and at the same time select VoD contents.

Note that while the processing in step S81 makes a state where the broadcast contents are displayed, but the portal page may be displayed at the same time, so an arrangement may be made where one of these is switched to and displayed, or both may be displayed by two windows or the like.

In step S64, the application 111 controls the photoreceiver 92, the remote controller 41 is operated, determination is made regarding whether or not one of the VoD contents has been selected, and the same processing is repeated until one of the VoD contents is selected.

In step S64, in a case where a selection signal is received at the photoreceiver 92 due to the user having operated the remote controller 41, and selection of one of the VoD contents is recognized, the processing advances to step S65.

In step S65, the application 111 requests the tuner to switch to the VoD channel where the stream data of the VoD content is to be distributed, based on the VoD channel information.

In response to this request, in step S42 the tuner 94 switches to the VoD channel where the VoD content requested by the application 111 is distributed.

In step S66, the application 111 controls the communication unit 93 based on the VoD server access information to access the VoD server 72 of the headend 12, and requests distribution of the VoD content selected by the user having operated the remote controller 41.

On the other hand, in step S21 the VoD server 72 determines whether or not there is a distribution request for VoD contents from one of the client terminals 13, and repeats the same processing until there is a request. In the event that there has been a request in step S21 for distribution of VoD contents due to the processing in step S66, the processing advances to step S22.

In step S22, the VoD server 72 supplies the stream data of the requested VoD content to the MUX 71.

In step S12, the MUX 71 supplies the stream data of the VoD content to the modulator 74. The modulator 74 modulates the stream data by C2-Q AM (C2-Quadrature Amplitude Modulation) for example, and distributes to the client terminal 13 at the VoD channel band.

In step S43, the tuner 94 is set to the VoD channel, and accordingly receives the stream data of the VoD contents distributed over the VoD channel. The tuner 94 supplies the received stream data to the renderer 95.

In step S83, the renderer 95 plays the audio and video of the VoD contents based on the stream data of the VoD content, and displays on the display unit 96.

Due to the above processing, the client terminal 13 displays a promotion program of VoD contents purchasable (selectable) from broadcast contents on the display unit 96, and also images regarding which VoD contents can be purchased (selected) are displayed. As a result, the user can purchase (select) VoD contents by operating the remote controller 41 while viewing the promotion program of VoD contents.

Also, upon purchasing (selection) of the VoD content being completed, the tuner 94 is switched to the VoD channel where the purchased VoD content is distributed, and the VoD content distributed from the VoD server 72 is displayed on the display unit 96 of the client terminal 13. Note that after the VoD content has been purchased (Selected) and playing has been started, the user can control the playing operations by simply operating the remote controller 41, for play control commands supplied from the remote controller 41 such as pause, fast-forward, fast-rewind, and so forth, for example, in the same way as processing in steps S66, S21, S22, S12, S43, and S83, instead of a command requesting distribution of VoD contents.

Also, the portal page managed by the VoD portal server is developed by the service provider which is the distributing source of VoD contents, so from the perspective of the manufacturer of the client terminals 13, all that has to be provided is an environment which can run a browser 91 implementing standardized APIs. That is to say, the service provider can design programs and so forth necessary for selecting (purchasing) contents. Accordingly, even if multiple different service providers which are distribution sources of VoD contents provide difference services, providing uniform service quality to the end user can be readily realized.

<Modification>
[Modification of Backend, Headend, and Client Terminal]

While description has been made above regarding an example where fixed VoD channels are set for each of the client terminals 13 beforehand, the VoD channels may be dynamically set at a timing of distribution of VoD contents being requested.

Figure 4:
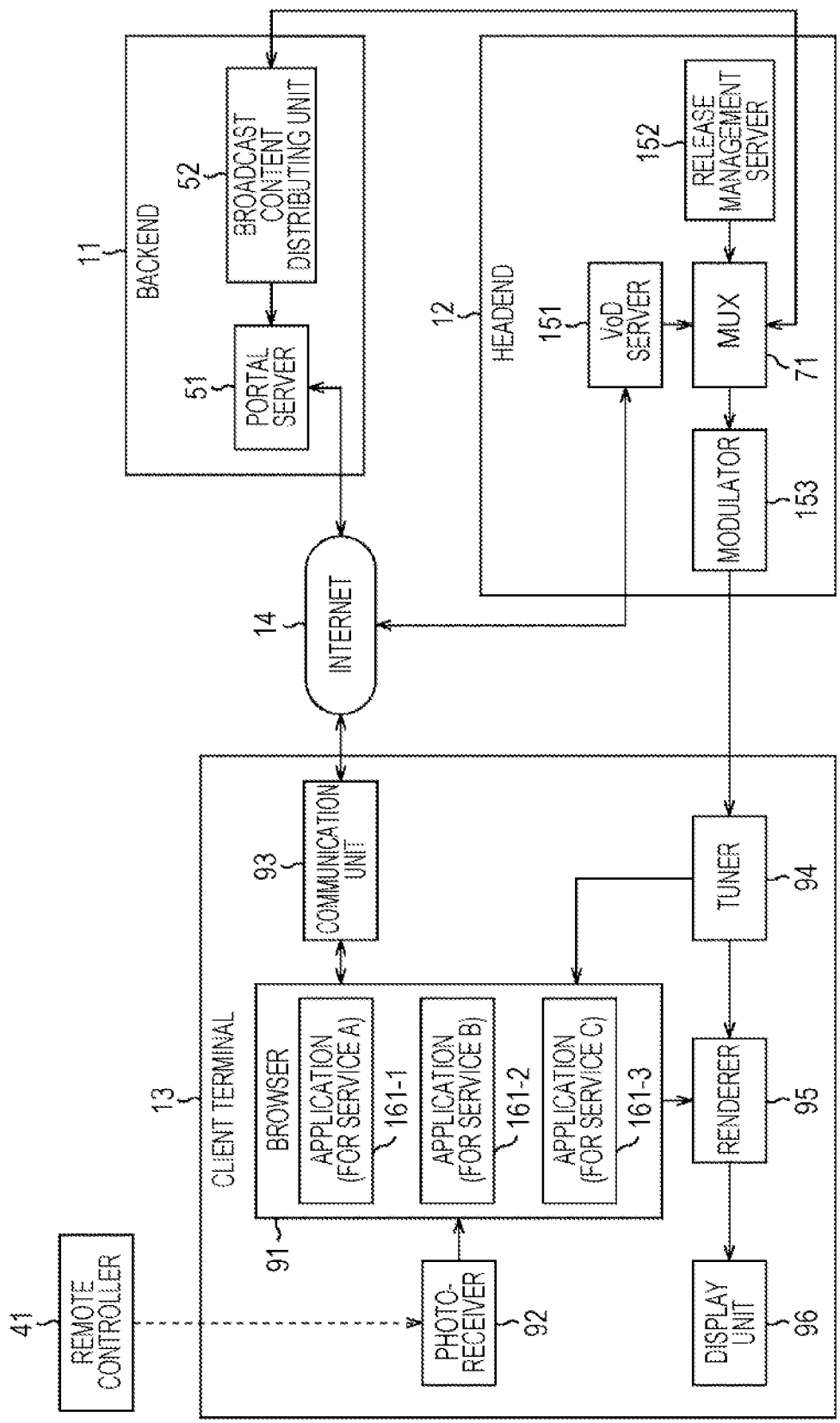
FIG. 4 is a block diagram illustrating a configuration modification of the first embodiment of the backend, headend, and client terminal in FIG. 1.

FIG. 4 is a block diagram illustrating a configuration example of the backend 11, headend 12, and client terminal 13 making up the IPTV distribution system in FIG. 1, arranged to dynamically set a VoD channel at a timing of distribution of VoD contents being requested. Note that in FIG. 4, configurations having the same functions as configurations in FIG. 2 will be denoted by the same names and same reference numerals, and description thereof will be omitted as appropriate.

Figure 2:
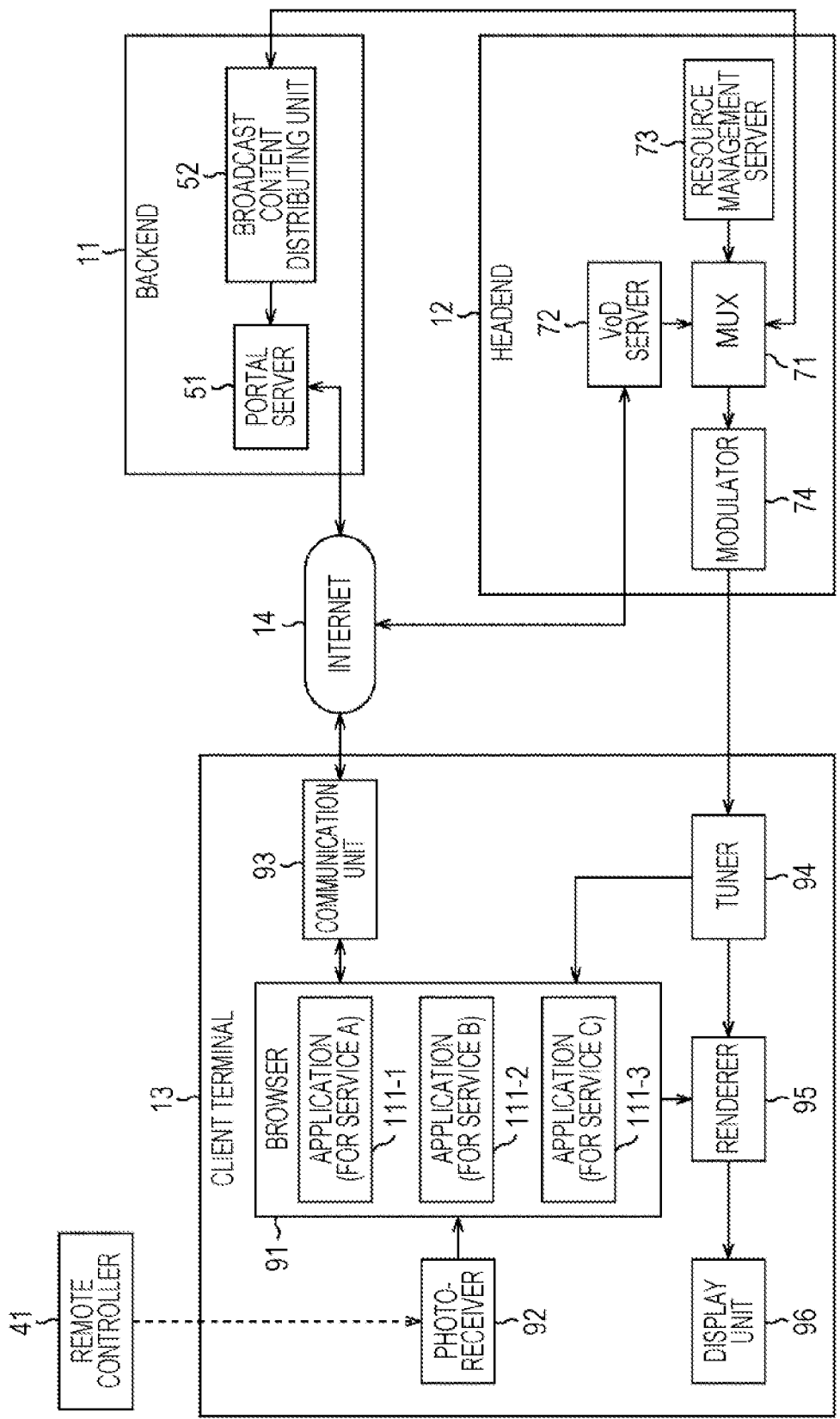
FIG. 2 is a block diagram illustrating a configuration example of a first embodiment of the backend, headend, and client terminal in FIG. 1.

That is to say, the block diagram in FIG. 4 differs from the configuration in FIG. 2 in that a VoD server 151, a resource management server 152, a modulator 153, and applications 161-1 through 161-3 have been provided instead of the VoD server 72, resource management server 73, modulator 74, and applications 111-1 through 111-3.

The basic functions of the VoD server 151 are the same as with the VoD server 72, but in the case that there is a distribution request for VoD contents, the resource management server 152 is requested to set the VoD channel to distribute that VoD content, along with information identifying that client terminal 13.

The basic functions of the resource management server 152 are the same as the resource management server 73, but a list indicating the correlation between the client terminal 13 which is the distribution destination of the VoD contents and the assigned VoD channel is further distributed by controlling the modulator 153, using part of the VoD channels. When the VoD server 151 is requested for distribution of VoD contents from the client terminal 13, the resource management server 152 dynamically allocates a VoD channel for distribution of the VoD contents, and updates this list.

The functions of the applications 161-1 through 161-3 are basically the same as the applications 111-1 through 111-3, but further, when distribution of VoD contents is requested, the above-described list is updated, and received by the tuner 94 at the VoD channel. The applications 161-1 through 161-3 recognize the VoD channel where the VoD contents regarding which distribution has been requested is actually distributed based on the information of the list, and the tuner 94 is controlled to be set to the recognized VoD channel, thereby causing reception of the VoD content stream data regarding which distribution has been requested.

[Communication Processing]

Figure 5:
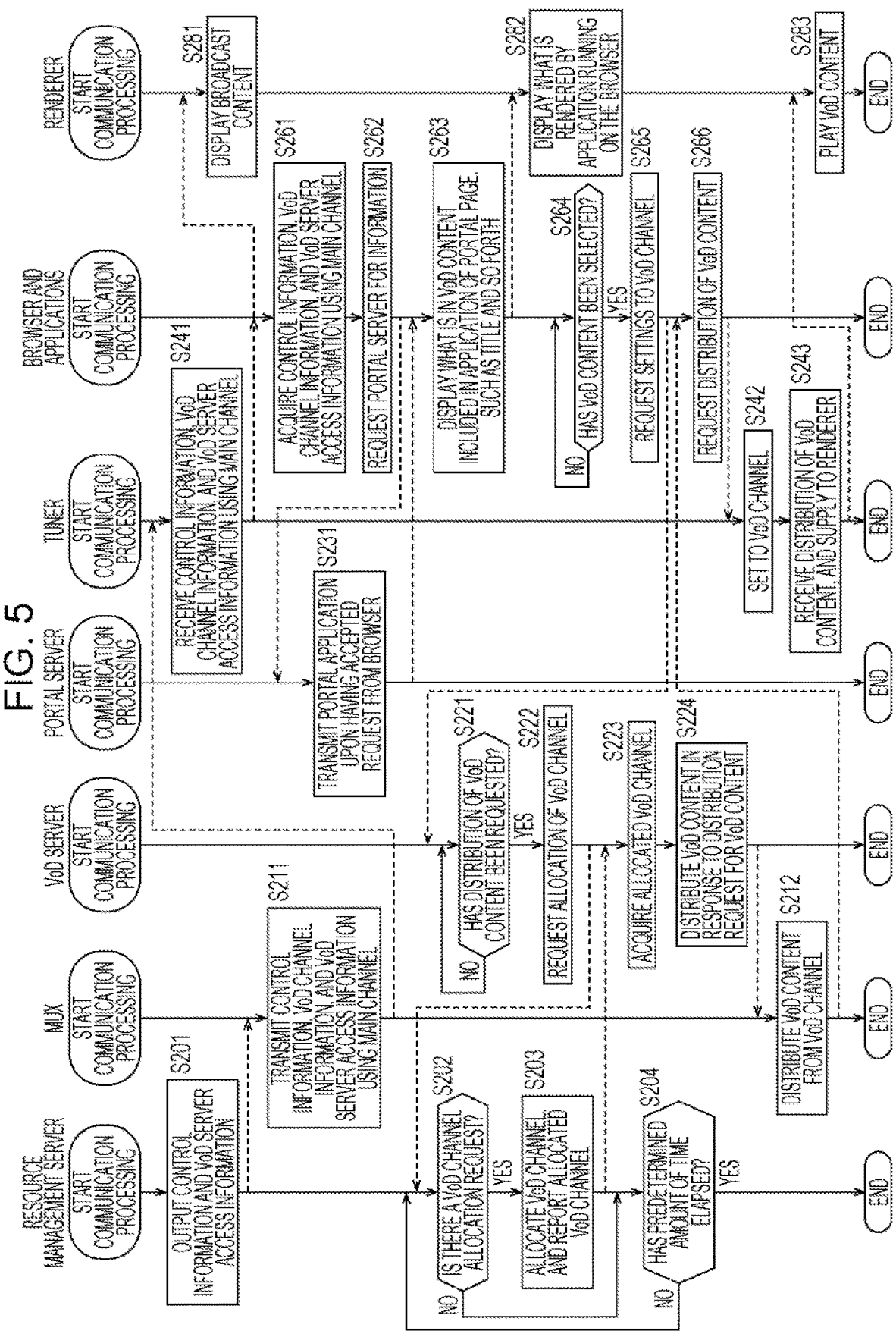
FIG. 5 is a flowchart for describing communication processing by the IPTV distribution system in FIG. 4.

Next, the communication processing by the IPTV distribution system in FIG. 4 will be described with reference to the flowchart in FIG. 5. Note that description of processing which is the same as processing described with reference to the flowchart in FIG. 3 will be omitted as appropriate.

That is to say, in step S201, the resource management server 152 generates, along with stream data of the broadcast contents, control information, VoD channel information, and VoD server access information, and supplies this to the MUX 71. Note however, that the initial VoD channel information does not stream any stream data of VoD contents, just information of a list indicating VoD channels allocated to each of the client terminals 13 managed at the headend 12. Accordingly, in the initial processing, no VoD channel to stream the stream data of VoD contents is assigned to any of the client terminals 13.

Figure 3:
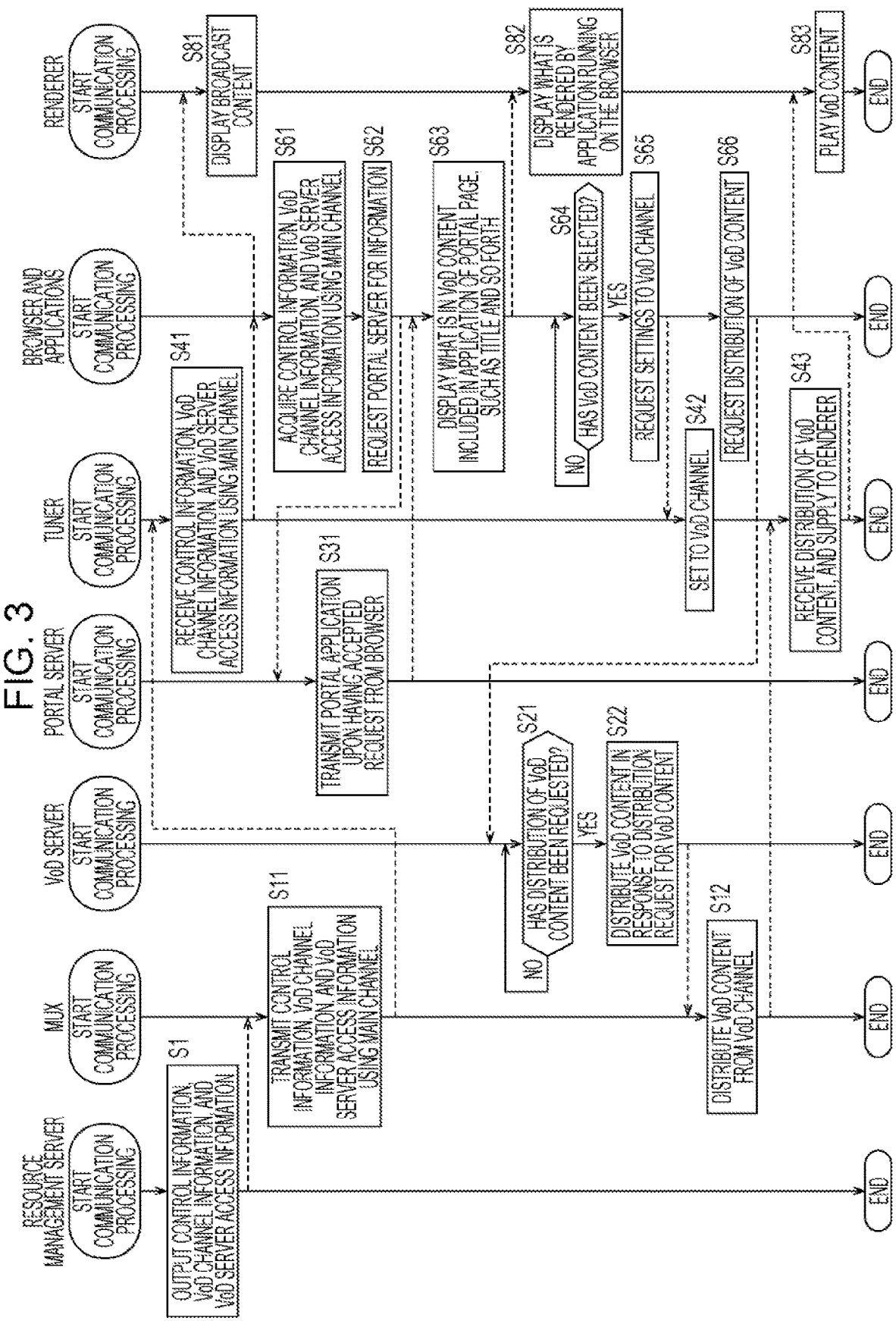
FIG. 3 is a flowchart for describing communication processing by the IPTV distribution system in FIG. 2.

The series of processing of steps S211 through S264 is the same as the processing of steps S11 through S64 in FIG. 3 except that the above-described VoD channel information differs, so description thereof will be omitted.

In the event that any one VoD content is selected in step S264, the processing advances to step S265.

In step S265, the application 161 request distribution of the selected VoD content and allocation of a VoD channel for distribution of the content VoD content.

The VoD server 72 determines in step S221 whether or not a request is transmitted from any one of the client terminals 13 for distribution of VoD content and allocation of a VoD channel, and the same processing is repeated until there is a request. In a case where there has been a request in step S221 for distribution of VoD content and setting of a VoD channel due to the processing in step S265, the processing advances to step S222.

In step S222, the VoD server 151 requests the resource management server 152 for information identifying the client terminal 13 requesting distribution of the VoD content, and requests allocation of a VoD channel.

At this time, in step S202 the resource management server 152 determines whether or not information identifying the client terminal 13 requesting distribution of the VoD content, and allocation of a VoD channel, have been requested. In a case where allocation of a VoD channel has been requested by the processing in step S222, the processing advances to step S203.

In step S203, the resource management server 152 allocates a VoD channel to the client terminal 13 which has requested distribution of the VoD content so as to distribute the requested VoD content, updates the list, and supplies that information to the VoD server 151 and the modulator 153.

In step S223, the VoD server 151 supplies the stream data of the requested VoD content to the MUX 71.

In step S212, the modulator 151 distributes the updated list to the client terminal 13 using a part of the VoD channel.

In step S266, the application 161 requests the tuner 94 to switch to the channel where the stream data of the VoD content is being distributed.

In response to this, in step S242 the tuner 94 switches to the VoD channel under control of the application 161. According to this processing, the tuner 94 receives the list distributed over the VoD channel. That is to say, the stream data of the VoD content is not being distributed at this VoD channel, and only the list is received. Based on the information in the list received by the tuner 94, the application 161 reads out the VoD channel to which it has been assigned for VoD contents actually distributed, and further controls the tuner 94 to switch to the VoD channel that has been read out. That is to say, a state where the stream data of the requested VoD content can be received is achieved by essentially switching the VoD channel twice.

In step S212, the MUX 71 supplies the stream data of the VoD content to the modulator 151. The modulator 151 modulates the stream data by C2-QAM (C2-Quadrature Amplitude Modulation) for example, and distributes to the client terminal 13 at a VoD channel band allocated to distribute the requested VoD content, based on the updated list.

In step S243, the tuner 94 acquires the VoD content stream data, at the VoD channel assigned to itself over which the VoD content stream data is actually distributed, and supplies to the renderer 95.

In step S283, the renderer 95 plays the audio and video of the VoD content based on the stream data of the VoD content.

In the event that allocation of a VoD channel is not requested in step S202, the processing of step S203 is skipped, and the processing advances to step S204. In step S204, the resource management server 152 determines whether or not a predetermined time has elapsed, and if not elapsed, the processing returns to step S202 and the processing of steps S202 through S204 is repeated until the predetermined time elapses.

Then, upon the predetermined time elapsing in step S204, the processing ends.

The above processing enables a VoD channel to be allocated when distribution of VoD contents is requested from a client terminal 13. As a result, when there is a request for distribution of VoD contents, a VoD channel can be dynamically allocated.

While description has been made above regarding an example of using cable television, the present technology can also be used with satellite distribution and mobile broadcast using base stations, by causing satellites used in satellite broadcasting and base stations used with mobile terminals to function in the same way as with the headend 12 described above, for example.

As described above, the present technology does away the need to implement configurations corresponding to individual service protocols of each service provider in the manufacturing and development of client terminals 13. As a result, manufacturing costs and developing costs to provide configurations corresponding to different service providers in the manufacturing and development of television receivers which are client terminals 13 can be reduced. Also, the service providers can each directly manage the configurations corresponding to their individual service protocols, thereby enabling the management costs thereof to be reduced as well.

The above-described series of processing can be carried out by hardware, or can be carried out by software. In a case where the series of processing is to be carried out by software, a program making up the software is installed into a computer. Note that computers include computers built into dedicated hardware, general-purpose personal computer capable of executing various types of functions by various types of programs being installed thereto for example, and so forth.

Figure 6:
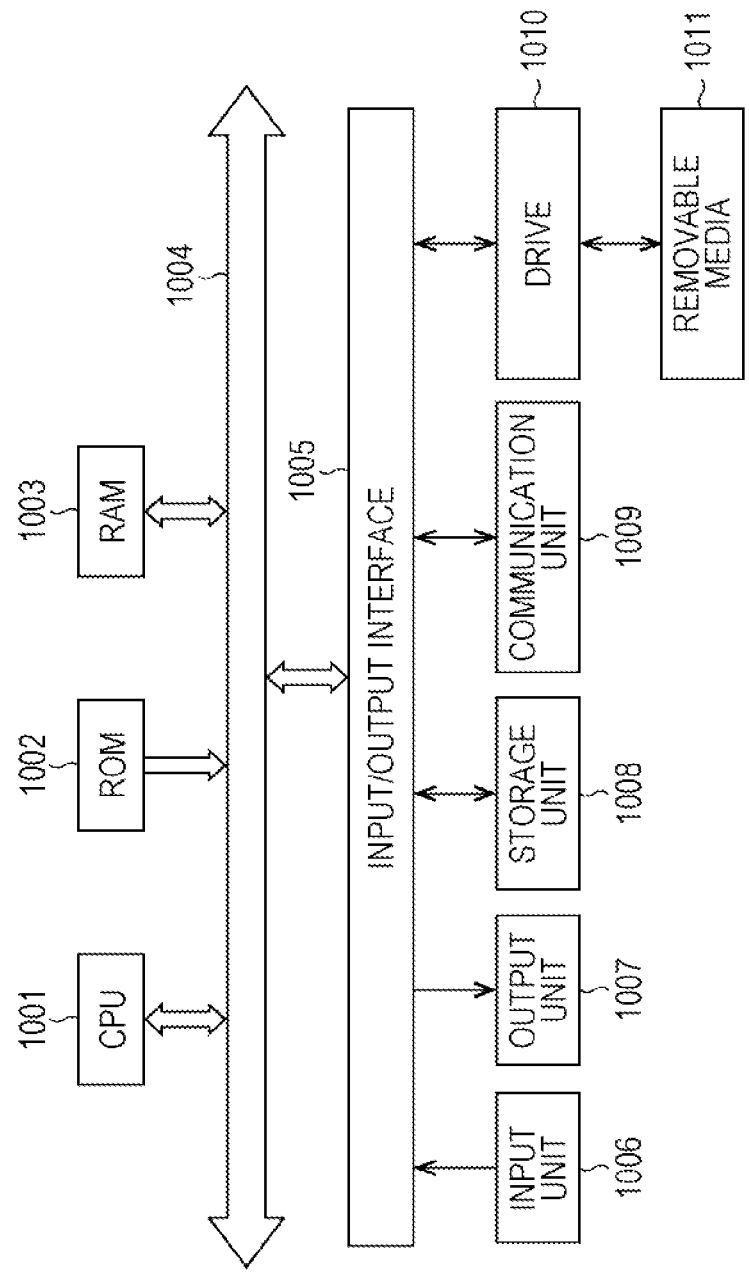
FIG. 6 is a diagram for describing a configuration example of a general-purpose computer.

FIG. 6 is a block diagram illustrating a hardware configuration example of a computer which executes the above-described series of processing by a program.

The computer has a CPU (Central Processing Unit) 1001, ROM (Read Only Memory) 1002, and RAM (Random Access Memory) 1003, which are connected to each other by a bus 1004.

An input/output interface 1005 is further connected to the bus 1004. Connected to the input/output interface 1005 are an input unit 1006, output unit 1007, storage unit 1008, communication unit 1009, and drive 1010.

The input unit 1006 is made up of a keyboard, mouse, microphone and so forth. The output unit 1007 made up of a display, speaker, and so forth. The storage unit 1008 is made up of a hard disk, non-volatile memory, or the like. The communication unit 1009 is made up of a network interface or the like. The drive 1010 drives removable media 1011 such as a magnetic disk, optical disc, magneto-optical disc, semiconductor memory, or the like.

In the computer configured as described above, the CPU 1001 loads a program stored in the storage unit 1008, for example, to the RAM 1003 via the input/output interface 1005 and bus 1004 and executes the program, whereby the above-described series of processing is performed.

The program which the computer (CPU 1001) executes may be recorded in a removable medium 1011 and provided as packaged media or the like for example. The program may also be provided via a cable or wireless transmission medium such as a local area network, the Internet, digital satellite broadcasting, or the like.

The program may be installed to the computer by mounting the removable media 1011 to the drive 1010 and installing to the storage unit 1008 via the input/output interface 1005. The program may also be received at the communication unit 1009 via a cable or wireless transmission medium such, and installed in the storage unit 1008. Alternatively, the program may be installed in the ROM 1002 or storage unit 1008 beforehand.

Note that the program which the computer executes may be a program of which processing is performed following the order described in the present specification in time sequence, or may be a program regarding which processing is performed in parallel, or at a necessary timing such as when a call-up is performed or the like.

Also, system as used in the present description means a collection of multiple components (devices, modules (parts) and so forth), regardless of whether all components are within the same housing. Multiple devices connected via network, and a single device having multiple modules stored within a single housing, are both systems.

Note that embodiments of the present disclosure are not restricted to the above-described embodiment, and that various modifications may be made without departing from the essence of the present disclosure.

For example, the present disclosure may assume a configuration of cloud computing, where a single function is distributed to multiple devices via network and processed collaboratively.

Also, the steps described in the above-described flowchart may be distributed among multiple devices and executed, besides being executed at a single device.

Further, in a case where multiple processes are included in a single step, the multiple processes included in that single step may be distributed among multiple devices and executed, besides being executed at a single device.

Note that the present technology may also assume the following configurations.

(1)

A client terminal including:

a reception unit configured to receive control information including broadcast contents, self-requested contents, and access information to a transmission server, from the transmission server via a first network of which the downstream transmission band has a band sufficient to transmission of contents; and a browser application program which is a program operable on a browser, configured to present the self-selectable contents based on control information transmitted from the transmission server, and request the transmission server for distribution of contents selected out of the presented contents, via a second network which is a bidirectional IP network.

(2)

The client terminal according to (1), wherein the reception unit receives the requested contents from the transmission server, via a channel on the first network allocated as the channel over which the requested contents are to be transmitted.

(3)

An operation method of a client terminal, the method including the steps of:

reception processing for receiving control information including broadcast contents, self-requested contents, and access information to a transmission server, from the transmission server via a first network of which the downstream transmission band has a band sufficient to transmission of contents; and a browser application program, which is a program operable on a browser, performing processing of presenting the self-selectable contents based on control information transmitted from the transmission server, and requesting the transmission server for distribution of contents selected out of the presented contents, via a second network which is a bidirectional IP network.

(4)

A program causing a computer to function as:

a reception unit configured to receive control information including broadcast contents, self-requested contents, and access information to a transmission server, from the transmission server via a first network of which the downstream transmission band has a band sufficient to transmission of contents; and a browser application program which is a program operable on a browser, configured to present the self-selectable contents based on control information transmitted from the transmission server, and request the transmission server for distribution of contents selected out of the presented contents, via a second network which is a bidirectional IP network.

(5)

A transmission server including:

a transmission unit configured to transmit, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and a client-terminal-requested-content supplying unit configured to supply the contents requested to the transmission unit, based on a play control signal for contents requested by the browser application program at the client terminal via a second network which is a bidirectional IP network.

(6)

The transmission server according to (5), further including:

a channel allocation unit configured to allocate a channel over which to transmit contents requested from the client terminal via the first network;

wherein the transmission unit transmits contents supplied from the client-terminal-requested-content supplying unit to the client terminal via the channel on the first network allocated by the channel allocation unit.

(7)

The transmission server according to (5) or (6), wherein, in a case where distribution of contents has been requested from the client terminal, the channel allocation unit dynamically allocates a channel to transmit the contents requested by the client terminal, to a channel other than the broadcast contents on the first network.

(8)

An operation method of a transmission server, the method including the steps of:

transmission processing for transmitting, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and client-terminal-requested-content supplying processing for supplying the contents requested in the transmission processing, based on a play control signal for contents requested by the browser application program at the client terminal via a second network which is a bidirectional IP network.

(9)

A program causing a computer to function as:

a transmission unit configured to transmit, to a client terminal, via a first network of which the downstream transmission band has a band sufficient to transmission of contents, control information for causing a browser application program running on a browser at the client terminal to operate, the control information including broadcast contents, contents requested by the client terminal, and access information to self; and a client-terminal-requested-content supplying unit configured to supply the contents requested to the transmission unit, based on a play control signal for contents requested by the browser application program at the client terminal via a second network which is a bidirectional IP network.

REFERENCE SIGNS LIST 11 backend
12, 12-1, 12-2 headends
13, 13-1 through 13-3 client terminals
14 Internet
51 portal server
52 broadcast content distributing unit
71 MUX
72 VoD server
73 resource management server
74 modulator
91 browser
92 photoreceiver
93 communication unit
94 tuner
95 renderer
96 display unit
111, 111-1 through 111-3 applications
151 VoD server
152 resource management server
153 modulator
161, 161-1 through 161-3 applications

The invention claimed is:

1. A television receiver for use in a television distribution system, said television receiver comprising:

a tuner device configured to enable connection to a first network so as to receive control information and access information to a content server, from an information server via the first network of which a downstream transmission band has bandwidth for transmission of contents;

a communication device to enable connection to a second network which is a bidirectional IP (Internet Protocol) network;

a processor configured to (i) operate as a borwser to cause a request for download of a portal page, which portal page pertains to providing selectable content for the television receiver, to be sent to a portal server by wy of the second network based on the control information received by the tuner device and to receive downloaded portal page information by way of the second network so as to enable a browser applicaiton program to be run, (ii) enable the selectable content to be presented for selection, and (iii) enable a request to be sent via the second network to the information server for distribution of content selected from the selectable content, and the processor of the television receiver being configured to run browser compatible application programs for one or more service providers, each application progrm having a different service protocol associated therewith to enable the television receiver to receive for display content from the one or more service providers; and wherein the access information comprises information indicating a correltion between the television receiver and first channel allocated for display of the selectable content, and wherein a second channel is allocatd for content delivery based on information received via the first channel and, under control of one of the browser compatible application programs, the tuner device switches the first channel to the second channel for display of the content selected from the selectable content.

2. The television receiver accodring to claim 1, in which the tuner device is configured to receive the selectable content from the information server via the allocated channed on the first network.

3. An operation method of a television receiver connectable to a television distribution system, the method comprising: enabling a connnection to a first network so as to receive control inforamation and access information to a content server, from an information server via the first network of which a downstream transmission band has bandwidth for transmission of conteents, the access information comprising information indicating a correlation between the television receiver and a first channel allocated channel for delivery of a listing of selectable content; enabling a connection to a second network which is a bidirection IP (Internet Protocol) network; operating a browser to cause a request for download of a portal page, the portal page pertaining to the listing of selectable content available to the television receiver, to be sent to a portal server by way of the second network based on the recieved control information and to receive portal page information by way of the second network so as to enable a browser applicatioin program to be run; enabling a reqeust to be sent via the second network to the information server for distribution of content selected from the selectable content; and enabling the browser application program to be run for one or more service providers, each application program having a different service protocol associated therewith to enable the television receiver to receive for display content from the two or more service providers; and wherein a second channel is allocated for content delivery based on informaton received via the first channel and, under control of one of the browser compatible application programs, a tuner device switches the first channel to the second channel for display of the content selected from the list of selectable content.

4. The operation method of the television receiver according to claim 3, further comprising receiving the selectable from the information server via an allocated channel on the first network.

5. A non-transitory computer readable medium having stored thereon a program which when executed causes a computer of a television receiver for use in a television distribution system to:

operate as a browser to cause a request for download of a portal page, which portal page pertains to at least one service provider that provides selectable content to the television receiver, to be sent to a portal server by way of a second network based on received control information and to receive downloaded portal page information by way of the second network so as to enable a browser compatible application program to be run, control rendering of the selectable content presented for selection using the received portal page, enable a request to be sent via a network to an information server for distribution of content selected from the selectable contents, receive, from the information server, information indicating a correlation between the television receiver and an allocated channel for content delivery, and enable the browser compatible application program to be run for the at least one service provider, each application program having a different service protocol associated therewith to enable the television receiver to receive for display the content or contents from the at least one service provider, and wherein the browser compatible application program causes a tuner device to switch from a first channel over which a listing of selectable content is delivered to a second channel on which content selected from among the listing of selectable content is delivered.

6. The television receiver according to claim 1, in which the control information includes a Portal Application Information Table for each of the one or more service providers.

7. The television receiver according to claim 1, in which the potal page includes titles of the selectable content.

8. The television receiver according to claim 1, in which when the request is sent via the second network to the information server for distribution of the content selected from the selectable content, the information server dynamically allocates a channel for the distribution of the content selected from the selectable content by updating the access information to indicate the correlation between the television receiver and the allocated channel for content delivery.

9. The operation method of the television receiver according to claim 3, in which the control information includes a Portal Application Information Table for each of the two or more service providers.

10. The operation method according to claim 3, in which the portal page includes titles of the selectable content.

11. The operation method of the television receiver according to claim 3, in which when the request is sent via the second network to the information server for distribution of the content selected from the selectable content, the information server dynamically allocates a channel for the distribution of the content.

12. The non-transitory computer readable medium according to claim 5, in which the received control information includes a Portal Application Information Table for each said service provider.

13. The non-transitory computer readable medium according to claim 5, in which the portal page includes titles of the selectable content.

14. The non-transitory computer readable medium according to claim 5, in which when the request is sent via the second network to the information server for distribution of the content selected from the selectable content, the information server dynamically allocates a channel for the distribution of the content.

15. The television receiver of claim 1, wherein the downloaded portal page comprises a downloaded application that controls rendering of the selectable content on the display.

16. The television receiver of claim 1, further comprising a renderer coupled to the processor and that is controlled by information contained in the downloaded portal page so as to display a listing of the selectable content.

17. The operation method of the television receiver according to claim 3, further comprising controlling rendering of the display of the selectable content presented for selection using the received portal page.

18. The television receiver of claim 1, wherein the television receiver comprises a display unit.

19. The operation method of the television receiver according to claim 3, wherein the television receiver comprises a display unit.

\* \* \* \* \*

UNITED STATES PATENT AND TRADEMARK OFFICE
CERTIFICATE OF CORRECTION

PATENT NO. : 10,687,112 B2
APPLICATION NO. : 14/362724
DATED : June 16, 2020
INVENTOR(S) : Yasuaki Yamagishi It is certified that error appears in the above-identified patent and that said Letters Patent is hereby corrected as shown below:

In the Specification

At Column 16, Line 52, replace "borwser" with --browser--

At Column 16, Line 55, replace "wy" with --way--

At Column 16, Line 59, replace "applicaiton" with --application--

At Column 16, Line 66, replace "progrm" with --program--

In the Claims

At Column 17, Line 4, replace "correltion" with --correlation--

At Column 17, Line 5, replace "and first" with --a first--

At Column 17, Line 7, replace "allocatd" with --allocated--

At Column 17, Line 13, replace "accodring" with --according--

At Column 17, Line 16, replace "channed" with --channel--

At Column 17, Line 20, replace "connnection" with --connection--

At Column 17, Line 21, replace "inforamation" with --information--

At Column 17, Line 24, replace "conteents" with --contents--

At Column 17, Line 29, replace "bidirection" with --bidirectional--

Signed and Sealed this
Fifteenth Day of August, 2023

Katherine Kelly Vidal
*Director of the United States Patent and Trademark Office*

CERTIFICATE OF CORRECTION (continued)
U.S. Pat. No. 10,687,112 B2

At Column 17, Line 34, replace "recieved" with --received--

At Column 17, Line 37, replace "applicatioin" with --application--

At Column 17, Line 37, replace "reqeust" with --request--

At Column 17, Line 45, replace "informaton" with --information--

At Column 18, Line 23, replace "potal" with --portal--